(12) United States Patent
Iglesias et al.

(10) Patent No.: US 11,733,959 B2
(45) Date of Patent: Aug. 22, 2023

(54) PHYSICAL COMPANION DEVICES FOR USE WITH EXTENDED REALITY SYSTEMS

(71) Applicant: Apple Inc., Cupertino, CA (US)

(72) Inventors: Samuel L. Iglesias, Palo Alto, CA (US); Michael E. Buerli, San Francisco, CA (US); Tyler R. Calderone, Cupertino, CA (US); Andrew P. Richardson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/187,733

(22) Filed: Feb. 26, 2021

(65) Prior Publication Data

US 2021/0326091 A1   Oct. 21, 2021

Related U.S. Application Data

(60) Provisional application No. 63/011,980, filed on Apr. 17, 2020.

(51) Int. Cl.
*G06F 3/147*   (2006.01)
*G06F 21/34*   (2013.01)
(Continued)

(52) U.S. Cl.
CPC .............. *G06F 3/147* (2013.01); *G06F 21/34* (2013.01); *G06K 7/1417* (2013.01); *G06T 11/00* (2013.01); *G06F 3/04845* (2013.01)

(58) Field of Classification Search
None
See application file for complete search history.

(56) References Cited

U.S. PATENT DOCUMENTS

| 9,412,205 B2 | 8/2016 | Mullins et al. |
| 10,317,989 B2 | 6/2019 | Rouvinez et al. |

(Continued)

FOREIGN PATENT DOCUMENTS

| EP | 1998533 | 12/2008 |
| EP | 3001287 | 3/2016 |
| WO | WO 2019/048298 | 3/2019 |

OTHER PUBLICATIONS

International Search Report and Written Opinion from PCT/US2021/023919, dated Jul. 7, 2021, 17 pages.

*Primary Examiner* — Yi Wang
(74) *Attorney, Agent, or Firm* — BakerHostetler

(57) ABSTRACT

Implementations of the subject technology provide a small, portable physical object for use in an extended reality system. The system may include a device that allows a user/wearer to interact with virtual representations of content such as stored data and/or applications overlaid on the user's physical environment. The object has a unique identifier that is obtainable by the device or another device. The object may be an inactive device without any internal circuitry, a passive device with circuitry that is activated by another device, or an active device having its own processing circuitry and/or a display housed in the body of the object. The object can be associated with content displayed by the device to provide a user with a physical object that can be moved or manipulated to move, modify, transport, or store the content generated, stored, and/or displayed in an extended reality environment.

21 Claims, 12 Drawing Sheets

(51) Int. Cl.
    *G06K 7/14*    (2006.01)
    *G06T 11/00*    (2006.01)
    *G06F 3/04845*    (2022.01)

(56) References Cited

U.S. PATENT DOCUMENTS

| | | |
|---|---|---|
| 2012/0166472 A1 | 6/2012 | Hoppenot et al. |
| 2014/0078174 A1 | 3/2014 | Williams et al. |
| 2017/0039986 A1 | 2/2017 | Lanier et al. |
| 2017/0053451 A1* | 2/2017 | Mott .................... G06T 19/006 |
| 2018/0101667 A1* | 4/2018 | Fujii .................... G06F 3/1238 |
| 2019/0325660 A1* | 10/2019 | Schmirler ............... G06F 3/011 |
| 2019/0332787 A1* | 10/2019 | Graf ........................ G06F 16/95 |
| 2020/0209955 A1* | 7/2020 | Guerriero ............... G06F 3/011 |

* cited by examiner

PHYSICAL COMPANION DEVICES FOR USE WITH EXTENDED REALITY SYSTEMS

CROSS REFERENCE TO RELATED APPLICATIONS

This application claims the benefit of priority to U.S. Provisional Patent Application No. 63/011,980, entitled "Physical Companion Devices For Use With Computer-Generated Reality Systems," filed on Apr. 17, 2020, the disclosure of which is hereby incorporated herein in its entirety.

TECHNICAL FIELD

The present description relates generally to extended reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user while the user views the physical environment via the augmented reality technology. However, the electronic information does not persist in the physical environment when not being viewed by the user via the augmented reality technology.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
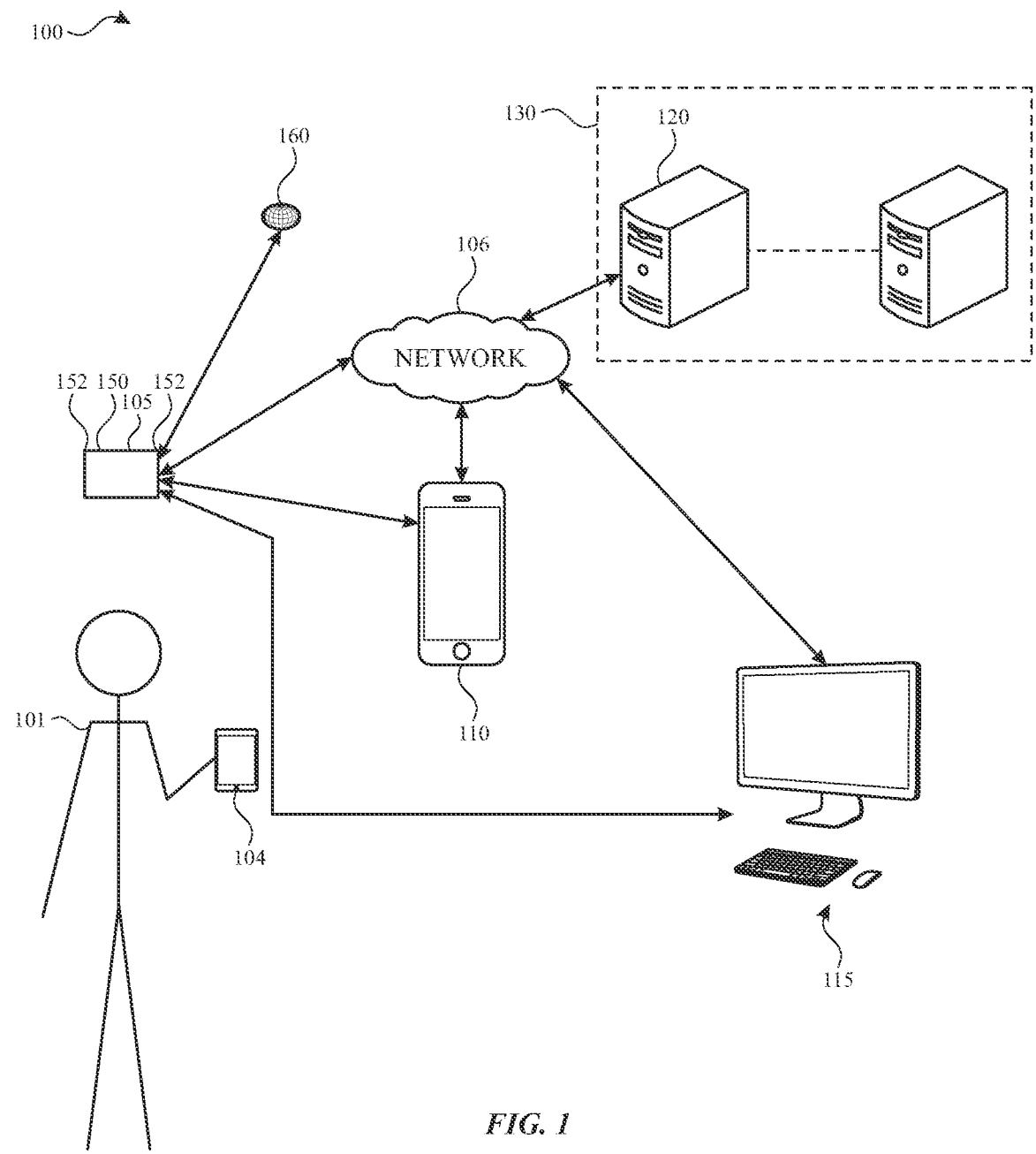
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide for extended reality systems to utilize one or more physical companion devices to which content generated and/or stored within an XR environment can be associated. The systems and methods disclosed herein associate system generated and/or stored content with the physical companion device such that the association persists even when the XR components of the system are idle or powered off. In this way, a user of an XR system can be provided with a portable companion device (sometimes referred to herein as a "stone" or a "go stone") that can be carried with the user to transport content from the XR environment within the physical world. The associated content can then be accessed at a later time by the same XR system when the companion device is detected by the XR system, and/or by other devices and/or XR systems when the companion device is detected by those devices and/or systems. In this way, the user of an XR system can be provided with the ability to carry content, such as a stack of digital photographs, the state of an active document or application, and/or digital currency (as examples) within the physical world for later access by various devices or systems.

In various implementations, the companion device can be an inactive device with a unique identifier that can be detected by a camera of another device, a passive device having a stored unique identifier that can be transmitted using wireless power from another device, or an active device having processing circuitry and/or memory for handling storage and/or transmission of identifiers, content, etc.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, a companion device 160, and a server 120. For explanatory purposes, the system architecture 100 is illustrated in FIG. 1 as including the electronic device 105, the handheld electronic device 104, the electronic device 110, the electronic device 115, the companion device 160, and the server 120; however, the system architecture 100 may include any number of electronic devices, companion devices, and any number of servers or a data center including multiple servers.

The electronic device 105 may be a smartphone, a tablet, or a head mountable portable system (e.g., a head mountable display device that can be worn by a user), that includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, radio frequency sensors, etc.) Moreover, the electronic device 105 may include hardware elements that can receive user input such as hardware buttons or switches. User input detected by such sensors and/or hardware elements correspond to various input modalities for initiating generating supplemental virtual content within a given extended reality environment. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect a presence of a person or object and/or an occurrence of an event in a scene to initiate providing supplemental virtual content within the extended reality environment.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

In an implementation, the electronic device 105 detects companion device 160 in proximity to the electronic device 105 (e.g., within range of one or more sensors 152 and/or within a field of view of one or more cameras of the electronic device 105 such as camera(s) 150). The electronic device 105 may detect a unique identifier of companion device 160 (e.g., using camera(s) 150, sensors 152, and/or communications circuitry internal to the electronic device 105). The electronic device 105 may determine (e.g., via communication with the companion device 160, the server 120, and/or memory at the electronic device 105) whether any content stored at the companion device 160, the server 120, the electronic device 105, and/or any other device is associated with the companion device 160.

For example, if companion device 160 is a passive device, electronic device 105 may obtain an identifier of the companion device 160 and obtain content, previously associated with the companion device 160, that is stored at the electronic device 105, server 120, and/or another device using that identifier. In other examples, a key (e.g., a decryption key) for accessing the content may be obtained from the companion device 160 and/or may be obtained and/or derived based on the identifier of the companion device 160. In another example, the electronic device 105 may obtain content that is stored at the companion device 160. In other examples, the electronic device 105 can assign and/or transfer content that is not yet associated with the companion device to the companion device 160.

The network 106 may communicatively (directly or indirectly) couple, for example, the electronic device 105, the electronic device 110, the companion device 160, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 16. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 16.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
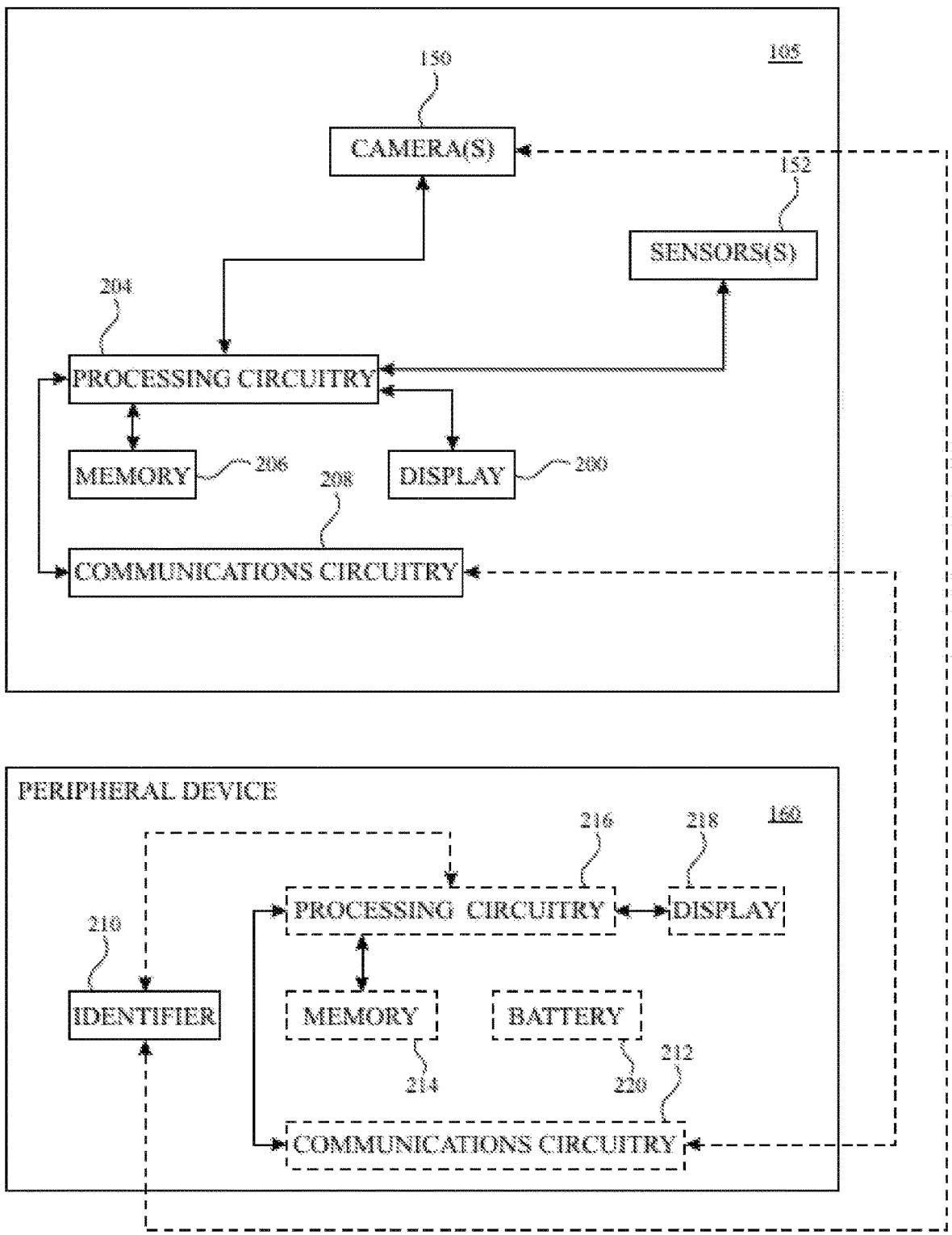
FIG. 2 illustrates a block diagram of example features of an electronic device, and a companion device, in accordance with one or more implementations.

FIG. 2 illustrates a block diagram of various components that may be included in electronic device 105 and companion device 160 in accordance with aspects of the disclosure. As shown in FIG. 2, electronic device 105 may include one or more cameras such as camera(s) 150 that capture images of the physical environment around the electronic device, one or more sensors 152 that obtain environment information associated with the physical environment around the electronic device 105. Sensors 152 may include depth sensors (e.g., time-of-flight sensors, infrared sensors, radar, sonar, lidar, etc.), one or more microphones, and/or other types of sensors for sensing the physical environment. Electronic device 105 also includes communications circuitry 208 for communication with companion device 160, electronic device 110, electronic device 115, servers 120, and/or other devices and/or systems in some implementations. Communications circuitry 208 may include radio frequency (RF) communications circuitry for detecting radio frequency identification (RFID) tags, Bluetooth Low Energy (BLE) communications circuitry, other near-field communications (NFC) circuitry, WiFi communications circuitry, cellular communications circuitry, and/or other wired and/or wireless communications circuitry.

As shown, electronic device 105 includes processing circuitry 204 (e.g., one or more processors and/or integrated circuits) and memory 206. Memory 206 may store instructions or code for execution by processing circuitry 204. Memory 206 may store (e.g., temporarily or permanently) content generated by and/or otherwise obtained by electronic device 105. In some operational scenarios, memory 206 may store identifiers of one or more companion devices such as companion device 160 of FIG. 2 in association with portions of the content stored in memory 206.

Processing circuitry 204 may generate display content for display by display 200. The display content may include images of portions of the physical environment and/or computer-generated content such as virtual reality content, augmented reality content, mixed reality content, etc. The display content may include one or more indicators of the content stored in memory 206. For example, when a user opens a digital photograph stored in memory 206 with electronic device 105, display 200 may display a copy of the image, a thumbnail of the image, etc. As described herein display 200 of electronic device 105 may be an opaque display the provides a pass-through video view of the physical environment around electronic device 105 to display 200 (e.g., using images from camera(s) 150) or may include a transparent or translucent display that allows the user of electronic device 105 to directly view portions of the physical environment through the display. Display 200 may overlay computer-generated (CG) content over the user's view of portions of the physical environment via or through the display.

In order to allow electronic device 105 and/or another device to associate content with companion device 160, companion device 160 includes an identifier 210 that is unique for that companion device and that can be accessed by electronic device 105 and/or another device. As one example, the identifier 210 may be a code that is printed or attached to a physical body of the companion device. The code, such as an alphanumeric code, an image-based code, a quick response (QR) code, or generally any code, may be obtained in, and/or derived from, an image captured by camera(s) 150 of electronic device 105 and/or another device to identify that companion device 160. In one or more implementations, the code may be detectable and/or obtainable using a specific image sensor, such as an infrared (IR) sensor.

In some implementations, companion device 160 is an inactive device without any internal circuitry that includes an inactive identifier 210. In this example, identifier 210 may be identifiable with a light-based sensor such as a camera, an optical sensor, an IR sensor, or another sensor capable identifying identifier 210 using light that is reflected by or emitted by identifier 210 at or near the surface of the companion device. However, in other examples, companion device 160 may be a passive device with communications circuitry 212 that is activated by another device such as by communications circuitry 208 of electronic device 105, or an active device having its own processing circuitry 216, memory 214, a battery 220, and/or a display 218 (e.g., an e-ink display or other display) housed in the body of the companion device. In implementations in which companion device 160 includes a display 218, display 218 may be an electronic ink (e-ink) display so that companion device 160 can operate with little power. In implementations in which companion device 160 includes processing circuitry 216 and/or communications circuitry 212, the identifier 210 may be stored in memory 214 rather than being visible on the exterior of the device body. Information stored in memory 214 may be encrypted and/or password protected.

Figure 3:
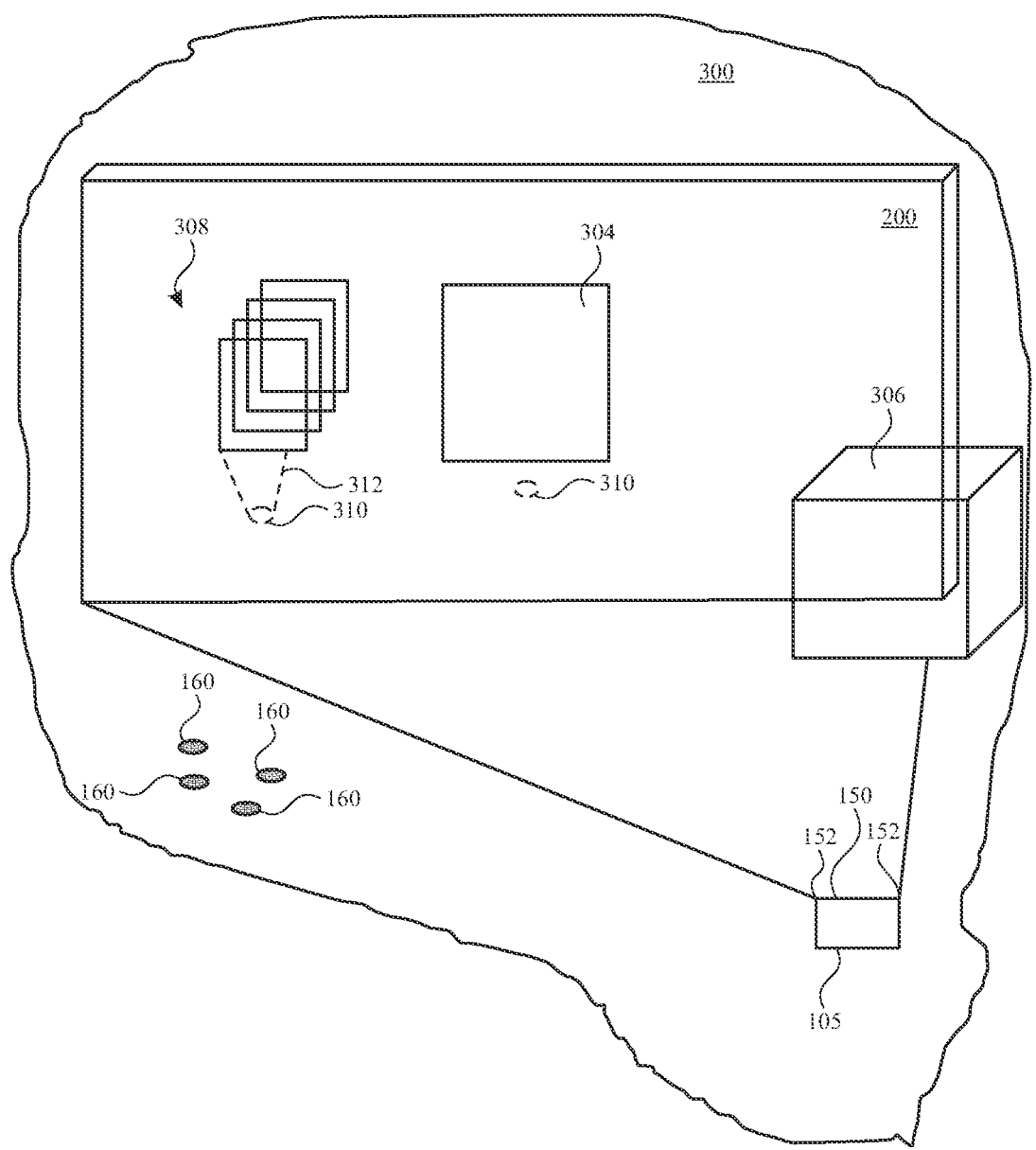
FIG. 3 illustrates an example of a physical environment of an electronic device and one or more companion devices in accordance with implementations of the subject technology.

FIG. 3 illustrates an example of a physical environment in which an electronic device 105 and multiple companion devices 160 are provided. In the example of FIG. 3, a user 101 wears an electronic device 105 in a physical environment 300. The physical environment 300, in the example of FIG. 3, includes a physical object 306, a portion of which can be viewed by user 101 via display 200 (e.g., based on images from one or more cameras such as camera(s) 150 that are provided to an opaque implementation of display 200 or directly through a transparent or translucent implementation of display 200) and portions of which can be viewed directly by the user without the use of any technology (if not otherwise blocked from view). In the example of FIG. 3, computer-generated content is being displayed by display 200 (e.g., overlaid on or in front of portions of physical environment 300). In this example, an application window 304 (e.g., a file manager application window, a browser window, a social medial application window, a content editor application window, or any other application user interface) representing an application is displayed by display 200. In this example, the user has also created a stack of photos 308 (e.g., by pulling digital images, from a photo library that is accessible by electronic device 105, into a virtual stack).

As indicated in FIG. 3, each companion device 160 may be a small (e.g., coin sized) physical object that is provided for use with an XR system that includes an XR device such as electronic device 105 that allows a wearer or user 101 to interact with virtual representations of content such as stored data (e.g., photos, videos, audio files, text files) and/or applications.

As shown in the example of FIG. 3, the application window 304 and the stack of photos 308 are each provided with a location indicator 310 displayed by display 200 the location indicator having an approximate size and shape of one of companion devices 160. In one example, the location indicator 310 is provided with a callout icon 312 visually linking the location indicator with the stack of photos 308 (e.g., digital images). However, FIG. 3 also shows another example in which a location indicator 310 is provided without a callout icon, the proximity to the application window 304 indicating the association between the location indicator 310 and the application window 304. The location indicators 310 indicate a location at which a companion device 160 can be placed to associate that companion device with the corresponding content displayed on the display 200.

Figure 4:
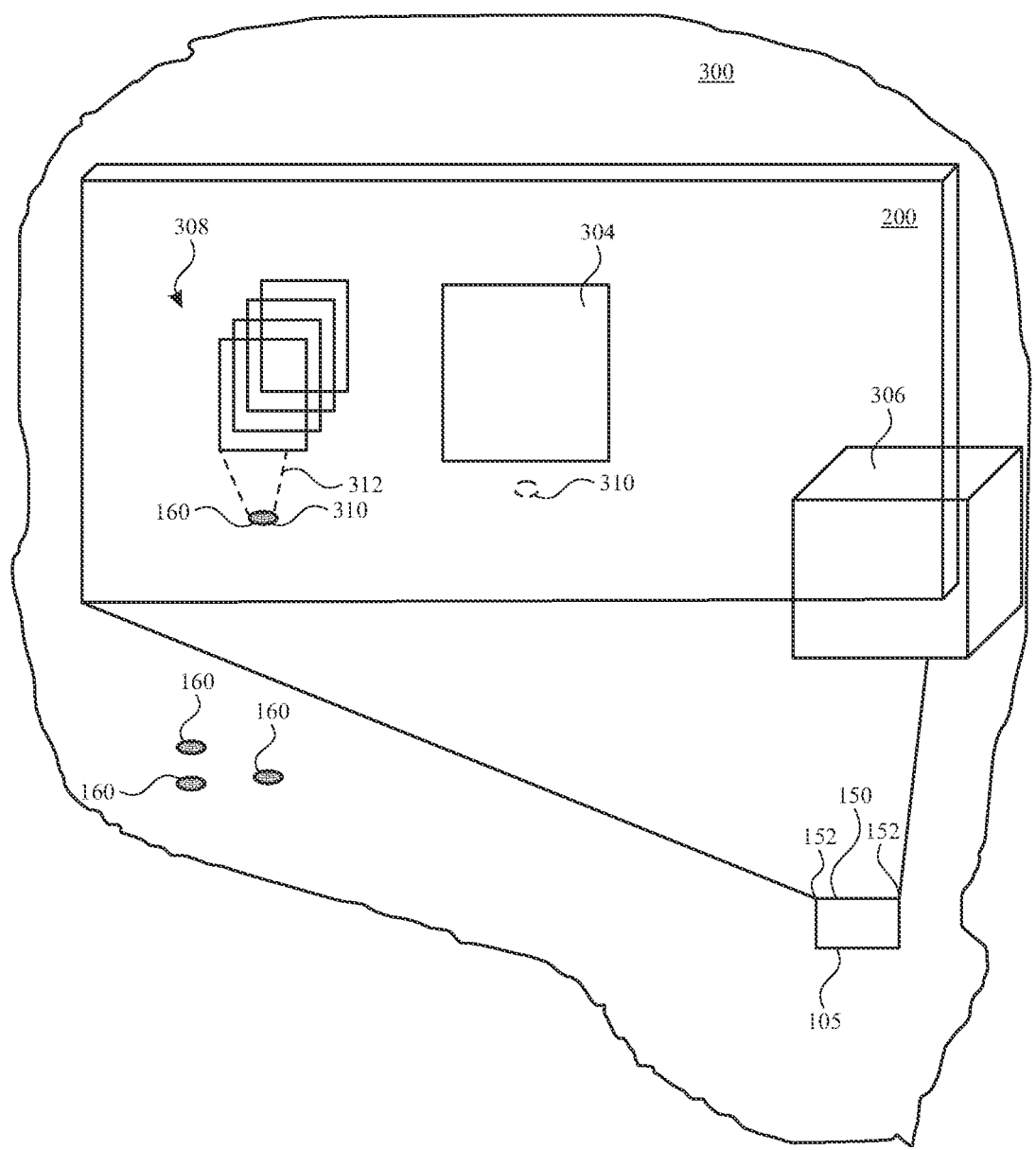
FIG. 4 illustrates aspects of a companion device being associated with stored content in accordance with one or more implementations of the subject technology.

FIG. 4 illustrates a scenario in which one of the companion devices 160 has been physically moved (e.g., by user 101) to the physical location in physical environment 300 that corresponds to the location over which location indicator 310 for the stack of photos 308 is displayed by display 200. In this scenario, when electronic device 105 detects (e.g., using camera(s) 150 and/or sensors 152) that companion device 160 is at the location corresponding to location indicator 310, electronic device 105 associates that companion device 160 with the stack of photos 308.

When a companion device 160 is associated with particular content (e.g., the stack of photos 308 in this example), the companion device 160 can store that content (e.g., in memory 214), the companion device 160 can store a link or a key to the content stored on another device (e.g., in the cloud at server 120), or (e.g., if the companion device 160 is an inactive or a passive device), the association can be stored at the electronic device 105 and/or in the cloud (e.g., by storing the unique identifier of the stone in connection with the stored content).

The association generated by electronic device 105 between companion device 160 and the stack of photos 308 can be persistently stored at the electronic device 105, in the cloud (e.g., at one or more of servers 120), and/or at the companion device 160. In this way, even when the companion device 160 is no longer in the field of view of camera(s) 150 and/or within the proximity of sensors 152 and/or communications circuitry 208 of electronic device 105, the stack of photos 308 can be transported with the companion device 160.

In the example of FIGS. 3 and 4, a device such as electronic device 105 that is configured to display computer-generated content overlaid on a view of a physical environment 300 is provided in an extended reality system that also includes a companion device that includes a portable body and a unique identifier that is obtainable by the device. As illustrated, the device may display an indicator of stored content (e.g., the stack of photos 308 or the state of the application corresponding to application window 304) overlaid on the view of the physical environment. The device may detect the companion device 160 in the physical environment 300, and responsive to a user request (e.g., moving the companion device to a location indicator 310 in this example) corresponding to the displayed indicator, associate the unique identifier of the companion device with information associated with the stored content.

Figure 5:
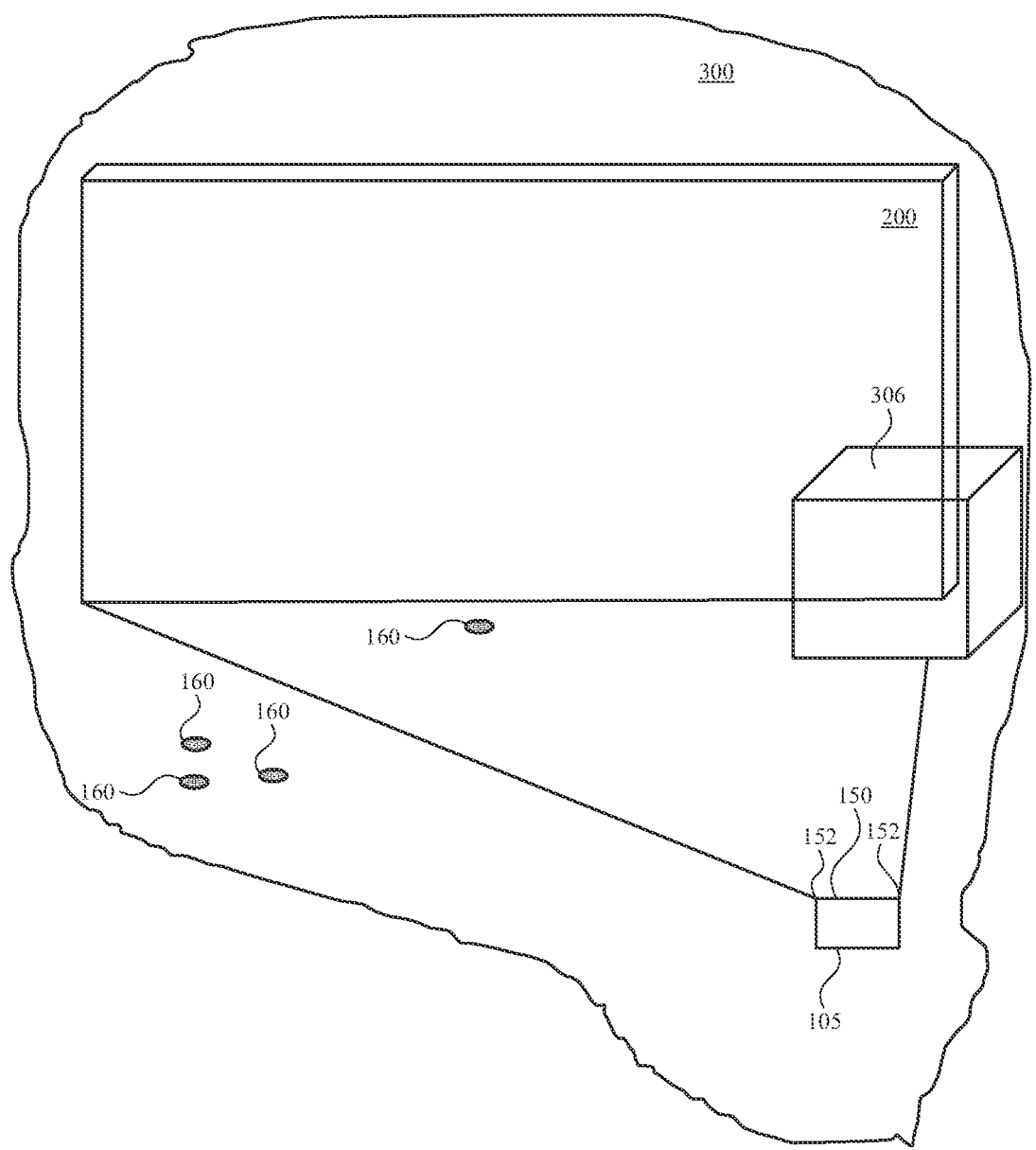
FIG. 5 illustrates aspects of a companion device that has been associated with stored content in accordance with one or more implementations of the subject technology.

FIG. 5 illustrates a scenario in which the companion device 160 that has been associated with the stack of photos 308 has been moved out of the portion of the physical environment 300 that is visible through or via display 200. In this example, the stack of photos 308 is no longer displayed on display 200, but is still persistently stored at companion device 160.

Figure 6:
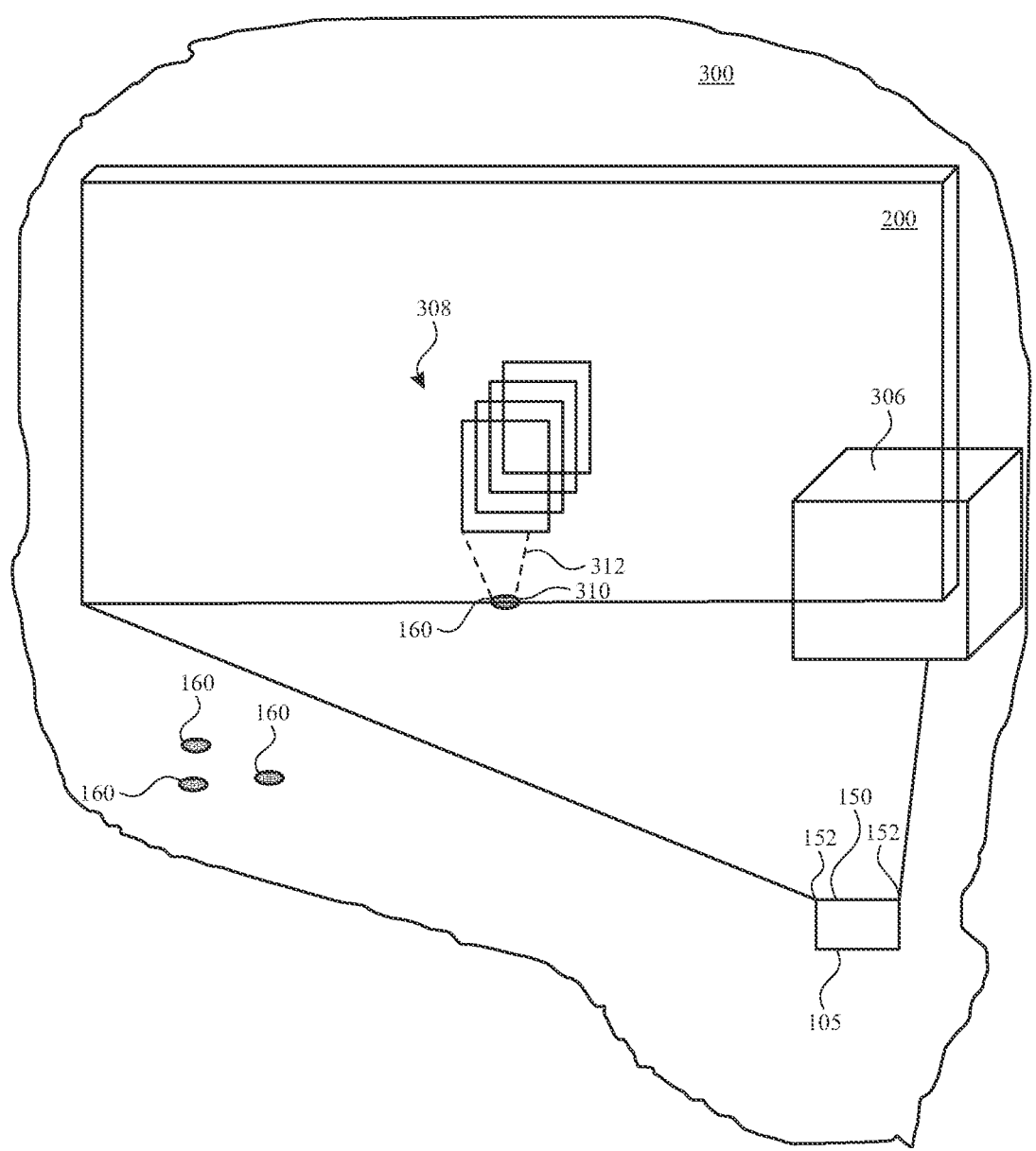
FIG. 6 illustrates aspects of a companion device that has been associated with stored content entering the field of view of an extended reality device in accordance with one or more implementations of the subject technology.

FIG. 6 illustrates how, at a later time, when the companion device 160 is again detected by the electronic device 105 at any location in the field of view corresponding to the area of display 200, an indicator of the set of photos 308 (or the set of photos 308 itself) can be displayed at that location. For example, a camera or another sensor of electronic device 105 can obtain an identifier of the companion device 160 when (or before) the companion device 160 enters the field of view corresponding to the area of display 200, obtain the stack of photos, a list of the photos, or thumbnails of the stack of photos (e.g., from local storage at the electronic device 105, from the companion device 160, or from remote storage at a server such as server 120) based on the identity of the companion device 160, and display the indicator of the stack of photos 308 and/or the stack of photos 308 itself at or near the location at which the companion device 160 enters the field of view corresponding to the area of display 200.

Further, and as discussed in more detail hereinafter in connection with FIG. 14, if the companion device 160 is later brought into proximity with another device (e.g., the user's laptop or an electronic device 105 or other device registered to the user or to another user), the companion device 160 can provide access to the set of photos 308 (e.g., and/or any other content that has been associated with that companion device 160) by the other device.

It should be appreciated that the example described in connection with FIGS. 3-6 in which the content associated with companion device 160 is a stack of photos, this example is merely illustrative and the companion device 160 can be associated with any other content in the XR environment. As another example, if the user of the electronic device 105 is operating an application such as a social media application associated with application window 304, the electronic device 105 can display a location indicator 310 associated with that application, at which that companion device 160 or another companion device 160 can be placed to associate that companion device 160 with that social media application (e.g., with the open user interface for that application, with the current state of the application, or any other aspect of the application).

Other examples of content from electronic device 105 that can be associated with a companion device 160 include, but are not limited to information for tethering apps to the companion device 160, information for associating a digital assistant action to the companion device 160, and/or information for associating a function to the companion device 160. In one example, the electronic device 105 may associate a specific function for a specific application or website to a companion device 160. For example, a companion device 160 may be associated with an order function or a purchase function for an electronic commerce application. In this way, a user of electronic device 105 can tap a physical object in their physical environment (i.e., the companion device 160 having been associated with that function) to place an order or make a purchase. Thus, in some implementations, the companion device 160 can provide a tactile object with which the user can interact physically while in an XR environment, and for which various different functions can be assigned. This can provide the user with a more intuitive way of interacting with the XR environment than systems in which tactile stimulus is unavailable when interacting with CG content in the XR environment (e.g., in VR, MR, or AR systems in which only gesture or voice control is provided) or in which a controller must be constantly held by the user to control the XR environment).

In yet another example, a group of companion devices 160 can be used to physically sort and/or arrange digital content, such as search results obtained using an electronic device 105. In this example, when a search (e.g., a local storage search, a remote storage search, or a network search such as an internet search) is performed by electronic device 105 while multiple companion devices 160 are in proximity to the electronic device 105, each companion device 160 can be associated with one of the multiple companion devices 160 to allow the user to physically move and/or select the companion devices 160 to sort and/or select search results.

Figure 7:
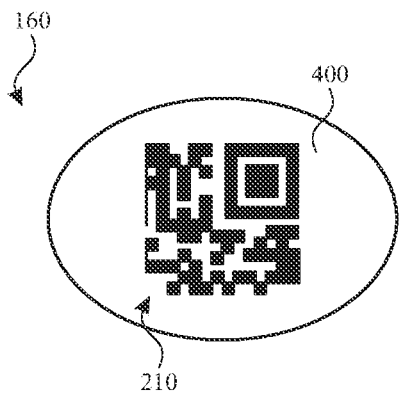
FIG. 7 illustrates a companion device having a portable body and a unique identifier in accordance with implementations of the subject technology.

FIGS. 7-10 illustrate various implementations of a companion device 160, in accordance with aspects of the disclosure. In the example of FIG. 7, companion device 160 is implemented as a passive device having a physical body 400 (e.g., body formed from plastic, rubber, metal, glass, and/or a combination of these and/or other materials) having an identifier 210 on an external surface of the physical body 400. In this example, the identifier 210 is implemented as a quick response (QR) code on an outer surface of physical body 400 that can be recognized by, for example, a camera of another device such as a camera of an electronic device 105 or a camera of another electronic device. The QR code can be printed, etched, or attached to an outer surface of the physical body 400 (as examples).

Figure 8:
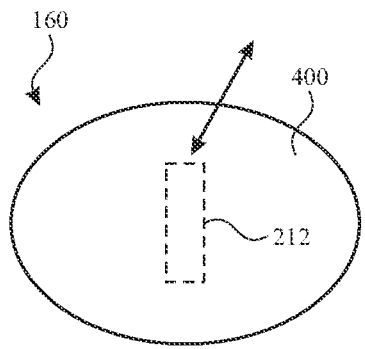
FIG. 8 illustrates a companion device having a portable body and communications circuitry in accordance with implementations of the subject technology.

FIG. 8 illustrates another example implementation of companion device 160 in which communications circuitry 212 is disposed within the physical body 400. For example, the physical body 400 may form a housing for companion device 160, the housing having an internal cavity in which the communications circuitry 212 is disposed. In this example, the communications circuitry 212 may be passive communications circuitry such as an NFC tag or an RFID tag that transmits an identifier of the companion device 160 using inductive power from another device, or can be active (e.g., locally powered) communications circuitry 212 that can be activated to transmit the identifier.

Figure 9:
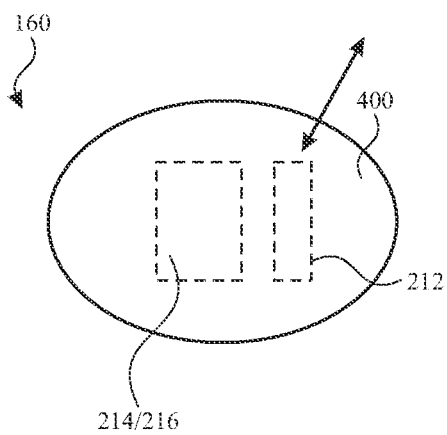
FIG. 9 illustrates a companion device having a portable body and processing circuitry in accordance with implementations of the subject technology.

FIG. 9 illustrates another example of a companion device 160 in an implementation in which the companion device is an active device having additional circuitry, such as processing circuitry 216 and/or memory 214 provided within the physical body 400 along with communications circuitry 212. In this example, memory 214 may be used to store an identifier of the companion device 160, an identifier of content stored at another device or server and that is associated with the companion device 160, cryptographic information for access to content stored at another device or server and that is associated with the companion device 160, and/or to store content at the companion device 160. The cryptographic information may be, for example, a key and/or information from which a key may be derived and/or obtained, and/or the cryptographic information may be authorization information, such as corresponding to a software license, that authorizes a proximate device to access to one or more applications, features, and/or functions that are provided by the software license.

Figure 10:
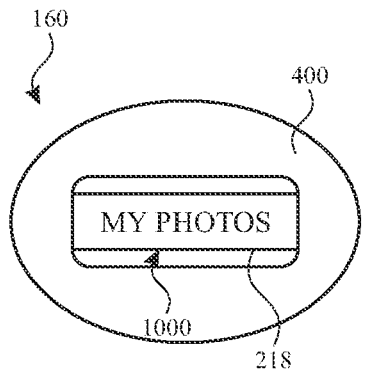
FIG. 10 illustrates a companion device having a portable body and display mounted to the portable body in accordance with implementations of the subject technology.

As shown in FIG. 10, companion device 160 can also be implemented with a display 218 that can be operated (e.g., by processing circuitry 216 within physical body 400 and/or by processing circuitry of another device such as electronic device 105) to display an indicator 1000 of content that is associated with that companion device 160 (e.g., and stored at that companion device 160, at electronic device 105, and/or at a remote server such as server 120). In the example of FIG. 10, the display 218 displays the text "My Photos" to indicate that digital photos of the user have been associated with the companion device 160. In other example, display 218 may display a thumbnail of one or more photos, or may display other indicators of other content that has been associated with the companion device.

Providing companion device 160 with a display 218, as in the example of FIG. 10, may facilitate the use of multiple companion devices 160. For example, a user may be able to carry several companion devices 160 in their pocket which they can later easily sort for access to photos, applications, in-progress editing projects (e.g., word processing documents or presentations), currency, and/or other content that has been associated with the companion devices 160. Display 218 can, in some implementations, provide a limited functionality user interface for companion device 160 (e.g., to allow the user to delete the content or the association with the content (e.g., by pressing and holding the display or a button provided on physical body 400), or to input a password to access the associated content. In any of the various implementations discussed herein, a companion device 160 may be provided without any user input components such as buttons, touch interfaces, etc. or any physical connectors (e.g., such that the content associated with the companion device is only accessible by another device and without physically coupling or connecting to the other device). In some implementations, including implementations in which companion device 160 includes processing circuitry and memory, companion device 160 may have limited functionality (e.g., functionality for storing associated content or storing information for accessing the associated content, without functionality for user interaction, processing data, executing applications, or the like).

In the various examples described herein, physical body 400 of companion device 160 may have a size that small enough for the companion device 160 to be carried in, for example, the palm of a user's hand, or for several of the companion devices 160 to be carried in the user's hand or the user's pocket. For example, the physical body may have a maximum dimension of less than two inches, less than one inch, or less than half of an inch. The physical body can have a rounded shape (e.g., a spheroid shape or an ellipsoid shape) as in the examples of FIGS. 7-10 or can have another shape such as a rectilinear shape. The physical body 400 can have a size and a shape that is smaller than the size of a smart phone or a smart watch, and that mimics the size and/or shape of a coin (e.g., a quarter, a nickel, a dime, etc.).

In the examples discussed in connection with FIGS. 3-6, content that is accessible by electronic device 105 is associated with a companion device 160 by placing the companion device 160 at a location in physical space that corresponds to the apparent displayed location of a location indicator 310. However, it should be appreciated that content can be associated with a companion device 160 in other ways.

Figure 11:
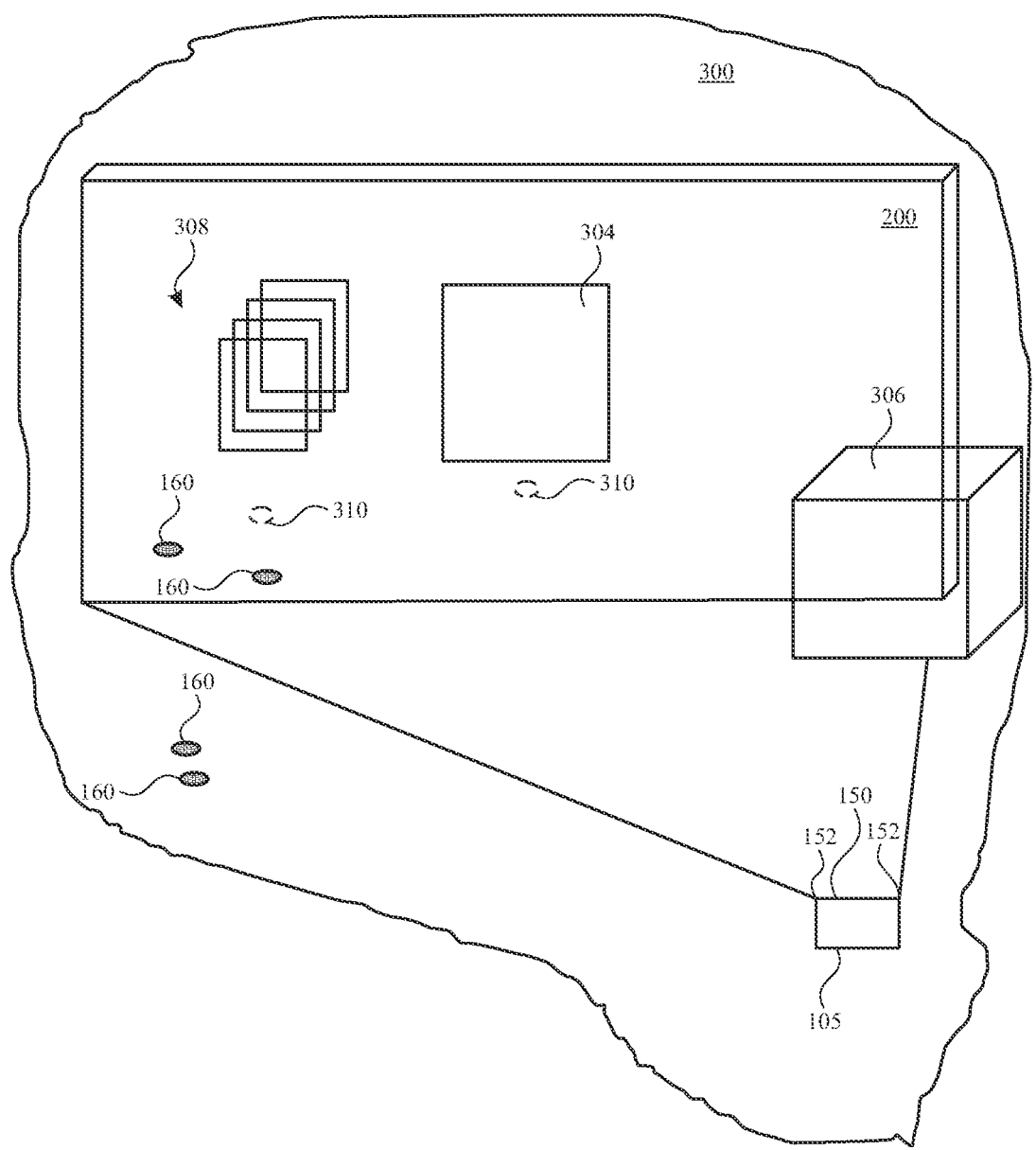
FIGS. 11-13 illustrate other manners of associating a companion device with content of an extended reality system in accordance with one or more implementations of the subject technology.

FIG. 11 illustrates an example in which a companion device 160 that is not associated with any content is visible within the field of view corresponding to the area of display 200, and in which the stack of photos 308 and application window 304 have associated location indicators 310 (which, it should be appreciated, are also optional).

Figure 12:
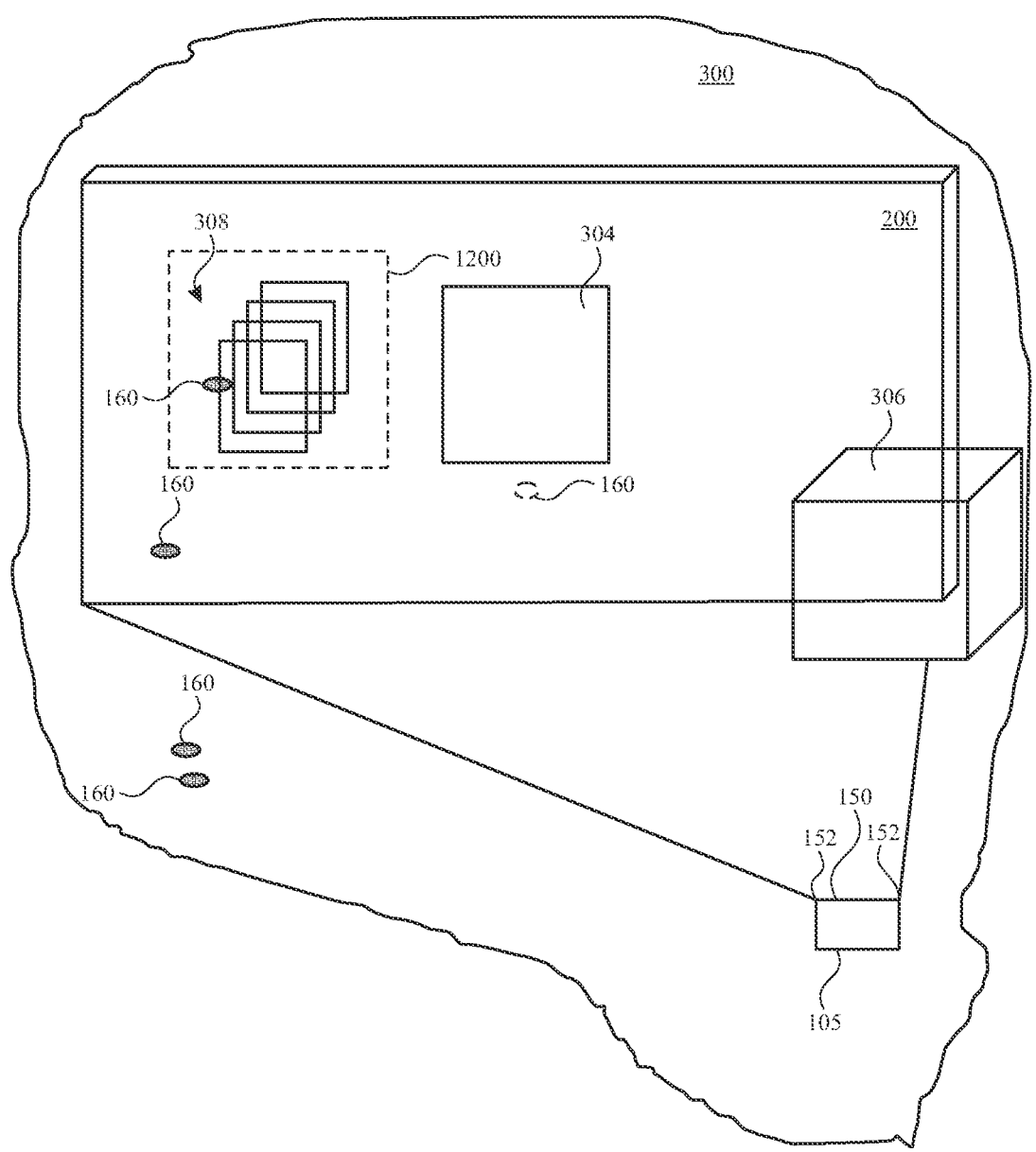

FIG. 12 illustrates one additional example in which the stack of photos 308 is associated with a companion device 160 by placing the companion device 160 at a location in the physical environment 300 that corresponds to the displayed representation of the stack of photos 308 on display 200. In this example, a visual indicator 1200 (e.g., dashed box surrounding the stack of photos or any other visual highlight or indicator) is displayed by display 200 to indicate to the user that the stack of photos 308 is being associated with the companion device 160. In some implementations, the user may be presented with an option to approve or decline the association.

Figure 13:
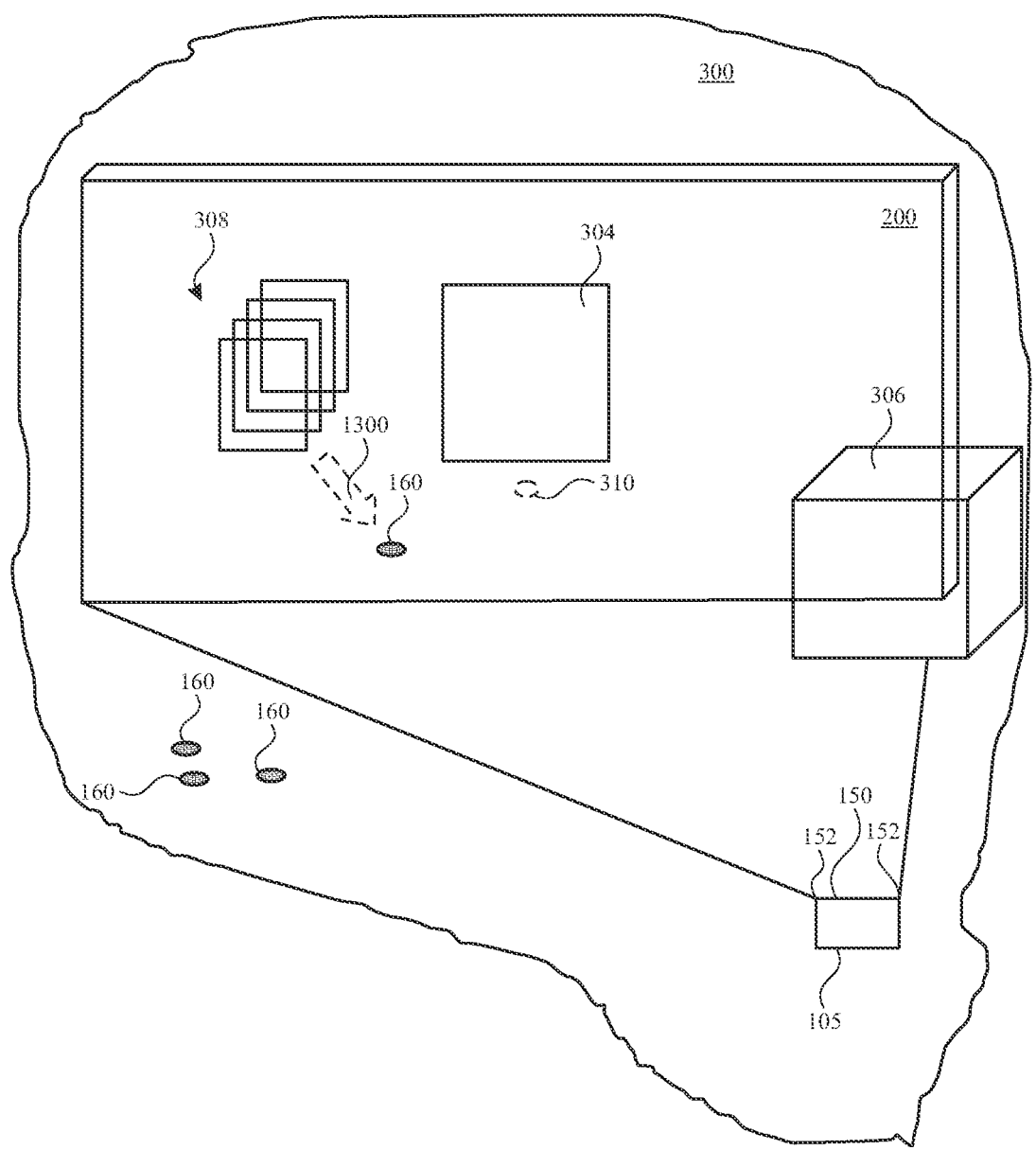

FIG. 13 illustrates yet another example in which the representation of the content itself (e.g., the displayed stack of photos 308 in this example) is moved to or toward the location of the companion device 160, as indicated by arrow 1300 to associate the content with the companion device. For example, the user 101 may provide a gesture input to electronic device 105 by virtually grabbing or pinching the displayed stack of photos and dragging the displayed stack to the location of companion device 160 or throwing or swiping the stack of photos to the companion device 160.

As discussed herein, providing a companion device 160 that can be associated with content from an extended reality system can facilitate transfer of the content to another device and/or access to the content by another device.

Figure 14:
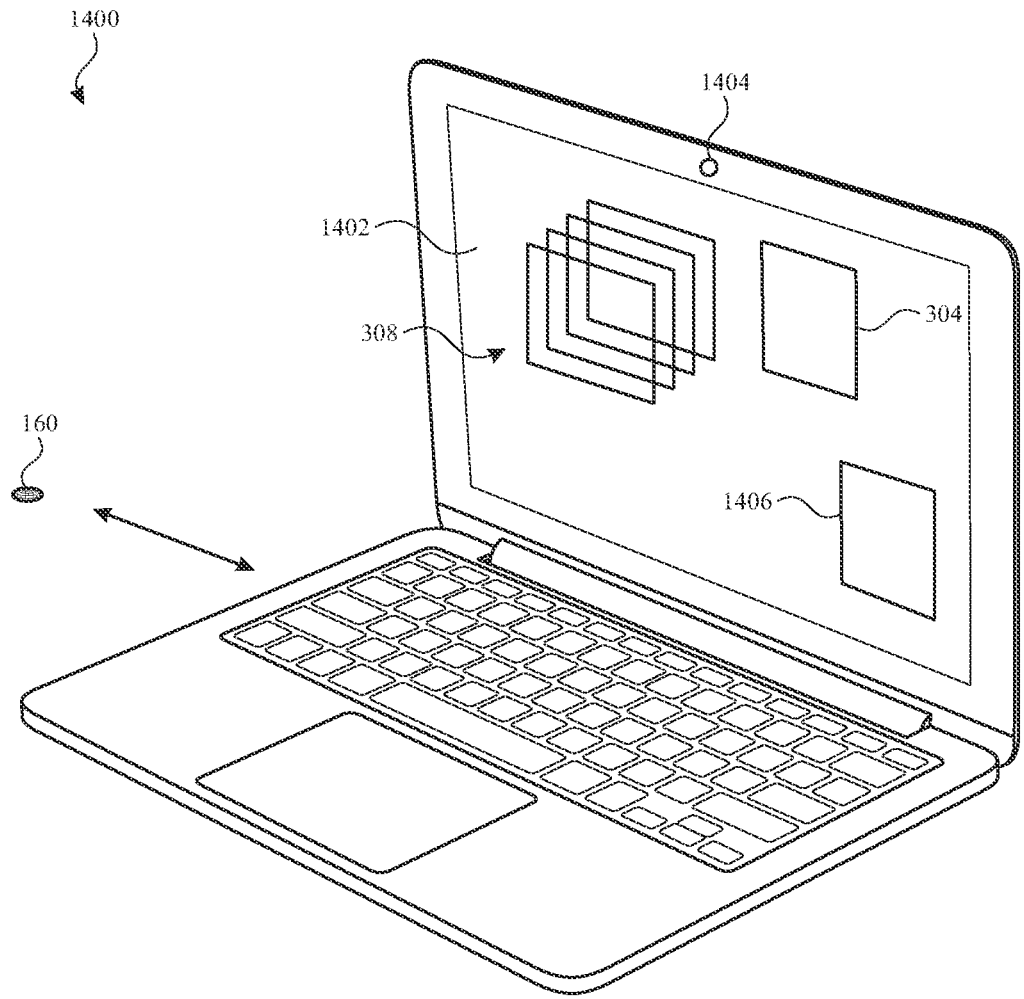
FIG. 14 illustrates a companion device providing access to content by another electronic device in accordance with one or more implementations of the subject technology.

FIG. 14 illustrates an example of another electronic device 1400 implemented as a laptop computer that can interact with companion device 160 to access content associated with the companion device 160. As indicated in FIG. 14, electronic device 1400 may obtain an identifier of companion device 160 (e.g., using a camera 1404 to capture an image of a code on an exterior surface of a physical body 400 of the companion device 160 as in the example of FIG. 7, or using NFC communications with communications circuitry of companion device 160 to obtain the identifier from communications circuitry of the companion device). The electronic device 1400 may then obtain associated content the companion device itself or from another source (e.g., from electronic device 105 or from server 120) using the identifier of the companion device 160. In some operational scenarios, electronic device 1400 may also obtain a key for the content associated with companion device 160 directly from companion device 160 or from another source using the identity of the companion device 160. In another example, electronic device 1400 may obtain the content associated with companion device 160 directly from the companion device 160 itself (e.g., if the associated content is stored in memory 214 of the companion device).

In the example of FIG. 14, electronic device 1400 has obtained, using companion device 160, the stack of photos 308 and the content for displaying the application window 304 as they were previously displayed by electronic device 105, and displayed the same content on display 1402. As shown in FIG. 14, electronic device 1400 may also display content 1406 that has been generated and/or obtained by electronic device 1400 independently of companion device 160. In some implementations, content 1406 can also later be associated with companion device 160 (e.g., for later user with electronic device 105 or for transfer to another user or another device).

Figure 15:
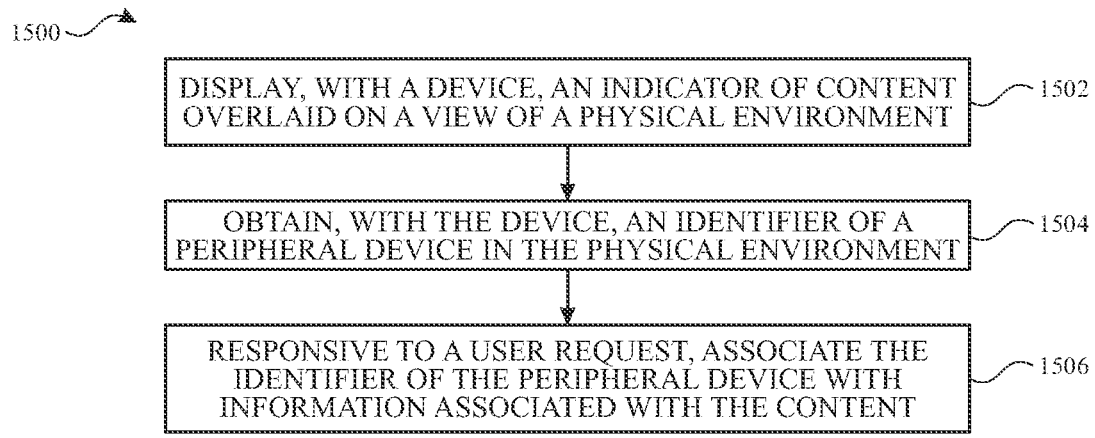
FIG. 15 illustrates a flow chart of an example process for associating content of an extended reality system with a companion device in accordance with implementations of the subject technology.

FIG. 15 illustrates a flow diagram of an example process 1500 for associating content with companion device in accordance with implementations of the subject technology. For explanatory purposes, the process 1500 is primarily described herein with reference to the electronic device 105 and companion device 160 of FIGS. 1, 2, and 7-10. However, the process 1500 is not limited to the electronic device 105 and companion device 160 of FIGS. 1, 2, and 7-10, and one or more blocks (or operations) of the process 1500 may be performed by one or more other components of other suitable devices, including the electronic device 110, the electronic device 115, and/or the servers 120. Further for explanatory purposes, some of the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

As illustrated in FIG. 15, at block 1502, a device such as electronic device 105 displays an indicator of content (e.g., the stack of photos 308, the application window 304, other computer-generated content, etc.) overlaid on a view of a physical environment. The content may, in various examples, be stored at the device or at a remote device such as another device or a server such as server 120.

At block 1504, the device obtains an identifier such as an identifier 210 of a companion device such as companion device 160 in the physical environment. The device may obtain the identifier by capturing an image of the portable body of the companion device (e.g., using camera(s) 150) or by receiving a wireless communication from the companion device (e.g., from communications circuitry 212 to communications circuitry 208 of FIG. 2).

At block 1506, responsive to a user request, the device may associate the identifier of the companion device with information associated with the content. The device may also determine (e.g., using camera(s) 150 and/or sensors 152) a location of the companion device 160 in the physical environment. Displaying the indicator of the content overlaid on the view of the physical environment at block 1502 may include displaying the indicator of the content overlaid on another location in the physical environment, and the user request may include a change, by a user, of the location of the companion device or the other location of the indicator (e.g., by a placement of the companion device at a location associated with the displayed indicator of the stored content, or a movement of the displayed indicator of the stored content to or toward a location of the companion device, as described above in connection with, for example, FIGS. 3-6, and 11-13).

Associating the identifier of the companion device 160 with the information associated with the content may include storing the identifier of the companion device and the information associated with the content at a remote server, such as server 120, that is separate the companion device and the device, storing the content at the companion device, and/or storing the identifier of the companion device at the electronic device 105 in connection with the content. In one example, associating the companion device with the content may include storing the identifier of the companion device at the device in association with the stored content. In some examples, the content can be transmitted to the companion device, and the companion device may store the stored content at the companion device. In some examples, the device may provide a key, and/or information from which a key can be derived, for the stored content to the companion device. The key may be a decryption key, authorization key, or other key that facilitates access and/or authorization to encrypted content, and/or unencrypted content, stored at the companion device, the device, or a remote server such as server 120. The content may be persistently associated with the identifier of the companion device, even after the companion device is removed from a field of view of the device.

In implementations in which the companion device includes a display such as an electronic ink display mounted to the portable body of the companion device, the companion device may also include a processor such as a processor of processing circuitry 204 of FIG. 2, that operates the electronic ink display. After the content has been associated with the companion device, the processing circuitry may operate the electronic ink display to display another indicator of the stored content associated with the unique identifier (e.g., as shown in FIG. 10).

As described above in connection with, for example, FIGS. 5 and 6, the device may detect the companion device at a new location in the physical environment, and display the indicator of the stored content overlaid on the view of the physical environment at the new location (e.g., responsive to detecting the companion device and based on the detected new location of the companion device using sensors and/or cameras of the device).

As described above in connection with, for example, FIG. 14, the companion device may provide access to the content by an additional device, such as electronic device 1400, separate from the companion device and the device, when the companion device is in proximity to the additional device.

As described above, one aspect of the present technology is the gathering and use of data available from specific and legitimate sources for associating content to a portable companion device. The present disclosure contemplates that in some instances, this gathered data may include personal information data that uniquely identifies or can be used to identify a specific person. Such personal information data can include video data, three-dimensional geometry data, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for associating content such as CG content to a portable physical device.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of associating displayed content to a physical companion device, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 16:
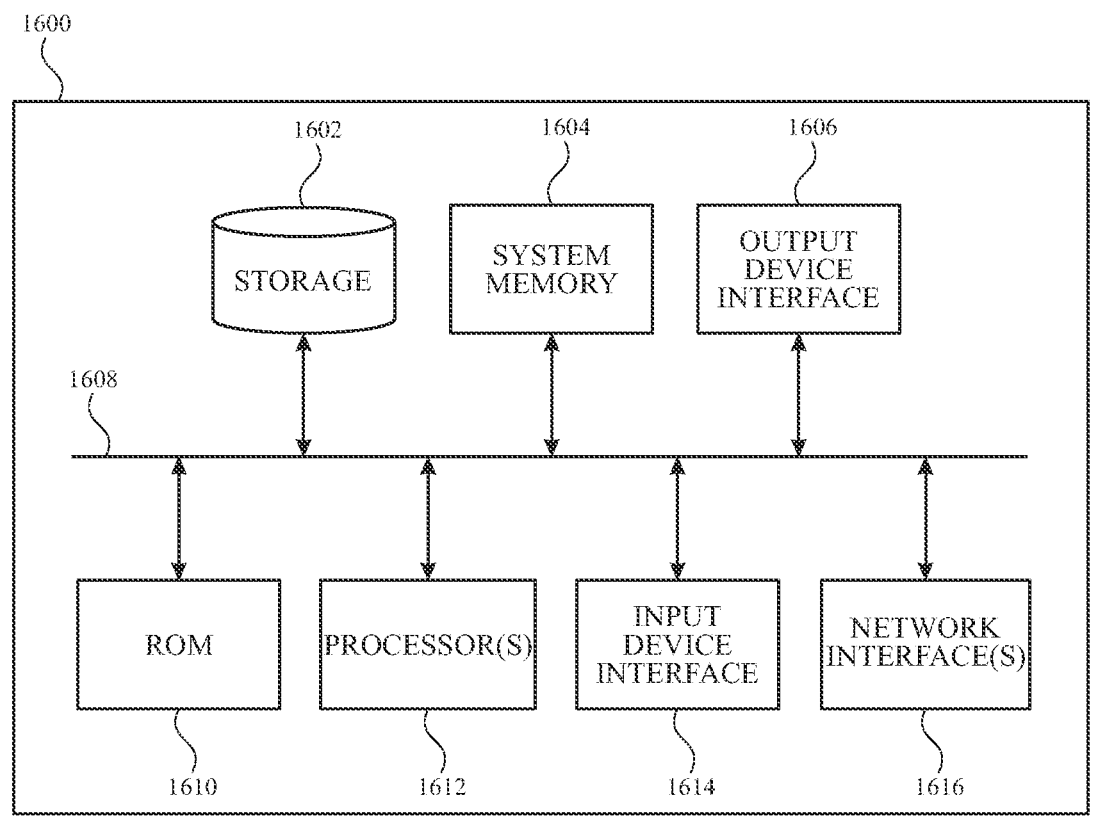
FIG. 16 illustrates an electronic system with which one or more implementations of the subject technology may be implemented.

FIG. 16 illustrates an electronic system 1600 with which one or more implementations of the subject technology may be implemented. The electronic system 1600 can be, and/or can be a part of, the electronic device 105, the handheld electronic device 104, the electronic device 110, the electronic device 115, and/or the server 120 as shown in FIG. 1. The electronic system 1600 may include various types of computer readable media and interfaces for various other types of computer readable media. The electronic system 1600 includes a bus 1608, one or more processing unit(s) 1612, a system memory 1604 (and/or buffer), a ROM 1610, a permanent storage device 1602, an input device interface 1614, an output device interface 1606, and one or more network interfaces 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are needed by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processing unit(s) 1612 may need at runtime. In one or more implementations, the processes of the subject disclosure are stored in the system memory 1604, the permanent storage device 1602, and/or the ROM 1610 (which are each implemented as a non-transitory computer-readable medium). From these various memory units, the one or more processing unit(s) 1612 retrieves instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 16, the bus 1608 also couples the electronic system 1600 to one or more networks and/or to one or more network nodes, such as the electronic device 110 shown in FIG. 1, through the one or more network interface(s) 1616. In this manner, the electronic system 1600 can be a part of a network of computers (such as a LAN, a wide area network ("WAN"), or an Intranet, or a network of networks, such as the Internet. Any or all components of the electronic system 1600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, a system is provided that includes a device configured to display computer-generated content overlaid on a view of a physical environment; and a companion device. The companion device includes a portable body; and a unique identifier that is obtainable by the device. The device is configured to display an indicator of stored content overlaid on the view of the physical environment; detect the companion device in the physical environment; and, responsive to a user request corresponding to the displayed indicator, associate the unique identifier of the companion device with information associated with the stored content.

In accordance with aspects of the disclosure, a method is provided that includes displaying, with a device, an indicator of content overlaid on a view of a physical environment; obtaining, with the device, an identifier of a companion device in the physical environment; and, responsive to a user request, associating the identifier of the companion device with information associated with the content.

In accordance with aspects of the disclosure, a companion device for an extended reality system is provided, the companion device including a portable body; communications circuitry disposed within the portable body; and processing circuitry configured to associate the companion device with content displayed at another device of the extended reality system, responsive to information received from the other device via the communications circuitry based at least in part on a location of the companion device in a physical environment of the companion device and the other device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term web site, as used herein, may include any aspect of a web site, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A system, comprising:
  a device configured to display computer-generated content overlaid on a view of a physical environment; and
  a companion device, comprising:
    a portable body; and
    a unique identifier that is obtainable by the device,
    wherein the device is configured to:
      display an indicator of stored content overlaid on the view of the physical environment;
      detect the companion device in the physical environment; and
      responsive to a user request corresponding to the displayed indicator:
        associate the unique identifier of the companion device with information associated with the stored content; and provide, to the companion device, cryptographic information for securely accessing the stored content.

2. The system of claim 1, wherein the user request comprises a placement of the companion device at a location associated with the displayed indicator of the stored content, or a movement of the displayed indicator of the stored content to or toward a location of the companion device.

3. The system of claim 1, wherein the companion device further comprises an electronic ink display mounted to the portable body.

4. The system of claim 3, wherein the companion device further comprises a processor configured to operate the electronic ink display to display another indicator of the stored content associated with the unique identifier.

5. The system of claim 1, wherein the device is configured to obtain the unique identifier by capturing an image of the portable body of the companion device or by receiving a wireless communication from the companion device.

6. The system of claim 1, wherein the device is configured to associate the companion device with the stored content by storing the unique identifier of the companion device at the device in association with the stored content.

7. The system of claim 1, wherein the stored content is stored at the device or at a remote device.

8. The system of claim 7, wherein the device is further configured to cause the stored content to be transmitted to the companion device, and wherein the companion device is configured to store the stored content at the companion device.

9. The system of claim 1, wherein the device is configured to persistently associate the stored content with the unique identifier of the companion device after the companion device is removed from a field of view of the device.

10. The system of claim 9, wherein the device is further configured to detect the companion device at a new location in the physical environment, and display the indicator of the stored content overlaid on the view of the physical environment at the new location.

11. The system of claim 1, wherein the companion device is further configured to provide access to the stored content by an additional device separate from the companion device and the device, when the companion device is in proximity to the additional device.

12. The system of claim 1, wherein the cryptographic information comprises a decryption key, the stored content is encrypted, and the companion device is further configured to:
provide the decryption key to another device proximate to the companion device for decrypting the encrypted stored content.

13. The system of claim 1, wherein the cryptographic information comprises authorization information corresponding to a software license that authorizes another device proximate to the companion device to access to one or more applications, features, and/or functions that are provided by the software license.

14. A method, comprising:
displaying, with a device, an indicator of content overlaid on a view of a physical environment;
obtaining, with the device and while the indicator of the content is displayed, an identifier of a companion device in the physical environment;
responsive to a user request corresponding to the displayed indicator:
associating the identifier of the companion device with information associated with the content; and
providing, to the companion device, cryptographic information for securely accessing the content.

15. The method of claim 14, further comprising determining, with the device, a location of the companion device in the physical environment, wherein displaying the indicator of the content overlaid on the view of the physical environment comprises displaying the indicator of the content overlaid on another location in the physical environment, and wherein the user request comprises a change, by a user, in the location of the companion device or the other location of the indicator.

16. The method of claim 14, wherein associating the identifier of the companion device with the information associated with the content comprises storing the identifier of the companion device and the information associated with the content at a remote server that is separate from the companion device and the device.

17. A companion device for an extended reality system, the companion device comprising:
a portable body;
a memory;
communications circuitry disposed within the portable body; and
processing circuitry configured to:
associate the companion device with content displayed at another device of the extended reality system, responsive to information received from the other device via the communications circuitry based at least in part on a location of the companion device in a physical environment of the companion device and the other device;
receive, via the communications circuitry, cryptographic information configured to provide secure access to the content; and
store the cryptographic information in the memory.

18. The companion device of claim 17, wherein the content comprises at least one of a file stored at the other device, a state of an application at the other device, or information for performing a function of the other device.

19. The companion device of claim 17, further comprising a display mounted to the companion device, the display configured to display an indicator of the content associated with the companion device after the content is associated with the companion device.

20. The companion device of claim 19, wherein the display comprises an electronic ink display.

21. The companion device of claim 17, wherein the cryptographic information comprises a decryption key, the stored content is encrypted, and the processing circuitry is further configured to provide the decryption key to another device proximate to the companion device for decrypting the encrypted stored content.

* * * * *